United States Patent [19]

Czumak et al.

[11] 4,106,042
[45] Aug. 8, 1978

[54] MULTIPURPOSE FILM CASSETTE HAVING A PROCESSOR DISABLING VALVE RETENTION ARRANGEMENT

[75] Inventors: Frank M. Czumak, Derry, N.H.; Joseph A. Stella, Peabody, Mass.

[73] Assignee: Polaroid Corporation, Cambridge, Mass.

[21] Appl. No.: 791,034

[22] Filed: Apr. 26, 1977

[51] Int. Cl.² ............................................. G03D 5/00
[52] U.S. Cl. ................................... 354/317; 352/130
[58] Field of Search .............. 352/130, 78 R; 354/88, 354/317, 318

[56] References Cited

U.S. PATENT DOCUMENTS

| | | | |
|---|---|---|---|
| 3,615,127 | 10/1971 | Land | 352/130 |
| 3,623,417 | 11/1971 | Eloranta et al. | 354/88 |
| 3,748,994 | 7/1973 | Stella | 352/130 |
| 3,938,885 | 2/1976 | Scholz | 352/78 R |

Primary Examiner—Monroe H. Hayes
Attorney, Agent, or Firm—Frederick J. Goettel

[57] ABSTRACT

Apparatus is provided for retaining a slideably displaceable valve member in its initial position prior to displacement of the valve to a final position responsive to film movement in a multipurpose film cassette of the type containing a film strip for exposure, processing and viewing without removal from the cassette. A leaf spring member forming a part of the valve member is configured to engage a ramped wall in the cassette housing. The spring force and friction between the spring member and the ramped wall tend to retain the slide valve positively in position until the valve is engaged by the film strip and moved to its final position wherein it seals off the processing fluid nozzle upon termination of the processing mode of operation of the cassette.

6 Claims, 4 Drawing Figures

MULTIPURPOSE FILM CASSETTE HAVING A PROCESSOR DISABLING VALVE RETENTION ARRANGEMENT

BACKGROUND OF THE INVENTION

This invention relates to film processing apparatus and, more particularly, to an improved multipurpose film handling cassette for exposing, processing and projecting images of photographic film.

Multipurpose photographic cassettes have been developed for use in motion picture photographic systems capable of processing an exposed strip of photographic material to a viewable condition as illustrated and described in such prior references as U.S. Pat. No. 3,615,127 issued to Edwin H. Land on Oct. 26, 1971; U.S. Pat. No. 3,623,417 issued Nov. 30, 1971 to Vaito K. Eloranta; and U.S. Pat. No. 3,748,994 issued July 31, 1973 to Joseph A. Stella, all of which are owned by the assignee of the present invention.

In such systems, use is made of a film handling cassette within which the several operations of exposure, chemical processing, drying and projection of the recorded images are accomplished without transferring the film from the cassette. In this arrangement, the strip of photographic film contained in the cassette can be exposed in a camera adapted to receive the cassette and then processed to provide viewable images by placing the cassette in a viewing apparatus equipped to activate the cassette-contained processor upon rewinding the exposed film strip. After processing in this manner, the viewing apparatus is operated as a projector to advance the film incrementally frame by frame past a light source for viewing of the recorded images.

In this arrangement, the unexposed photosensitive strip, initially wound upon a supply reel, preferably passes from the supply reel through a normally inoperative processing station and then across an opening of the cassette which functions at different intervals as both an exposure and projection station. Beyond the exposure station, the film is wound onto the takeup reel.

When substantially the entire length of the photosensitive strip in the cassette has been exposed and wound onto the takeup reel, the cassette is then loaded into a special purpose projector in which the motion of the film is reversed, this time passing from the takeup reel onto the supply reel. In its movement in this reverse direction, the film strip actuates the normally inoperable processing station so that the film strip is subjected to processing treatment in which a thin layer of processing fluid is supplied to the portion of the film emulsion intermediate the film margins by means such as, for example, a doctor blade in communication with and supplied with processing fluid passing through a nozzle communicating with a processing fluid reservoir. Immediately following the fluid deposition, in response to further film advancement, a valve member is actuated to move into blocking engagement with the processing fluid nozzle accordingly terminating further passage of processing fluid from the reservoir. Following a predetermined delay period, the film bearing the still wet layer of processing fluid is then again advanced through the exposure-processing station for projection and to complete drying of the film.

It can be appreciated that following the deposition of the processing fluid layer upon the film and prior to advancement of the still wet film strip through the exposure-processing station for the initial projection and drying operations that it is critical that the flow of processing fluid through the nozzle be completely and positively terminated immediately following deposition of the processing fluid upon the film strip. As briefly set forth above, in prior designs, incorporated in the processor is a slideable nozzle valve which is utilized to close off the processor nozzle and thereby disable the processor immediately following treatment of the film strip with the processing fluid. In relation to the nozzle opening, the valve is positioned initially in front of the nozzle opening in terms of film strip travel during rewind, i.e., during deposition of processing fluid. Additionally, a pressure pad component is positioned beneath the nozzle opening in a position such that a film engaging surface on the pressure pad is directly under the nozzle opening to thereby retain and interpose incremental portions of the film strip firmly against the under surface of the fluid applicator housing.

Following the processing operation and responsive to engagement by a film discontinuity or the like, located at the leading or takeup end of the film strip, the valve member is moved from its initial position so that it underlies and blocks the nozzle opening. Further, during this displacement of the valve, the pressure pad is cammed downwardly away from the film strip by side cams of the valve so as to deactivate the pressure pad and to free the film strip for unrestricted travel in either direction for subsequent projection and rewind cycles.

Accordingly, the valve member which is adapted to slide readily from its initial position to its processor disabling position serves not only to shut off the flow of processing fluid from the processor, but also serves the important function of displacing the pressure pad, which performs a critical function in spreading the desired processing fluid layer upon the film strip, during the processing operation, into a position where it will not interfere with the film strip travel once the processing has been accomplished. Accordingly, it will be appreciated that it is extremely important that the slide valve be accurately located and that premature release of the valve not occur prior to the time it is caused to move from its initial position into sealing engagement with the processing fluid nozzle.

One prior art approach to retaining the slide valve in its initial open position has been the use of a frictionally engaging member or the like such as is illustrated in U.S. Pat. No. 3,938,885, "Multipurpose Audiovisual Cassette System" of D. T. Scholz. Such an arrangement, however, has been found inadequate to retain the valve in its initial position during rough handling, for example, should the cassette be dropped prior to exposure and processing of the film strip.

Other approaches to retaining the slide valve in its initial open position are described in copending U.S. patent application Ser. No. 729,390, filed Oct. 4, 1976 by J. A. Stella, entitled "Photographic Cassette Having Pressure Plate Release of a Processor Disabling Valve" and in copending U.S. patent application Ser. No. 729,389, filed Oct. 4, 1976, by F. M. Czumak, entitled "Photographic Cassette Having Pressure Plate Release of a Processor Disabling Valve." In each of the above-identified applications, means are provided for preventing displacement of the valve member at all times prior to movement of the multipurpose cassette's pressure plate to the position it occupies during high speed continuous advancement of the film. In each of the described embodiments of these applications, physical contact is present between the slideable valve member and the pressure plate. In such cassettes, the slideable valve member also serves, in conjunction with a pair of electrical contacts located in the cassette, to provide an indication to the viewing apparatus as to the processed or unprocessed condition of a cassette inserted therein. The contact between the slide valve and the pressure plate results in electrical continuity between the two components and is considered to be undesirable. Electrical insulation between the pressure plate and the slide valve is of course possible, however, such a provision adds a step to the production costs and the risk of establishing electrical contact between the two due to insulation failure or the like still remains.

SUMMARY OF THE INVENTION

In accordance with the present invention, the slideable valve member which serves to seal off the processing fluid nozzle in a cassette of the type described above is retained in its initial position by means of an integrally formed leaf spring member which engages complementary cassette structure. Engagement of the slide valve by the film strip at the end of the processing cycle results in advancement of the valve to its sealing position. During such advancement, the leaf spring member deflects out of retaining engagement with the complementary cassette structure.

In a preferred embodiment, the cassette structure comprises a ramped wall facing in a direction angularly displaced from and opposite to the direction of movement of the film strip during movement of the slide valve. The leaf spring engages the ramped wall in a manner which results in a force between the spring and the wall tending to bias the valve towards its initial position.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof, will best be understood from the following description of the preferred embodiment when read in connection with the accompanying drawings wherein like numbers have been applied in the different figures to denote the same parts and wherein:

DESCRIPTION OF THE PREFERRED EMBODIMENT

Figure 1:
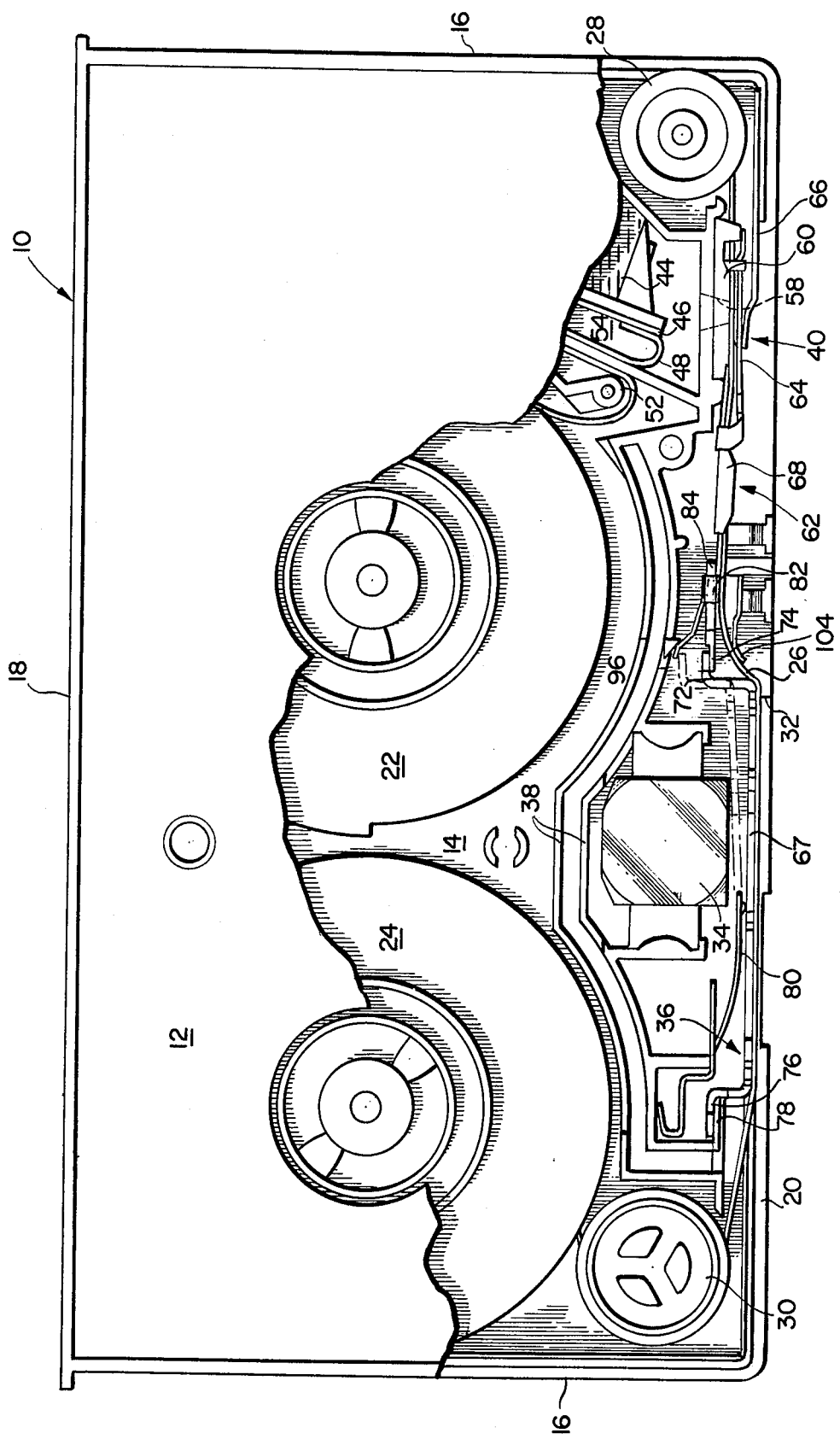
FIG. 1 is a diagrammatic view, in elevation, partially cut away to show the interior of a compact multipurpose film handling cassette embodying features of this invention.

The multipurpose film cassette with which the present invention is particularly adapted for use is illustrated in FIG. 1 to include an outer housing 10 in the shape of a rectangular parallelepiped having front and back walls 12 and 14 respectively, end walls 16, a top wall 18 and a bottom wall 20. Mounted for rotation between the front and back walls are supply and takeup reels 22 and 24 to which supply and takeup leader ends of a film strip 26 are affixed by appropriate means. In passing from the supply reel 22 to the takeup reel 24, the film strip 26 is trained through a series of generally straight runs defined in part by an idler roller and a snubber roller, 28 and 30 respectively, and a second idler roller disposed generally in the upper right hand corner of the cassette, not shown in the drawings. As shown, the film strip 26 is trained over an opening 32 in the bottom wall 20 both for exposure in an appropriate camera (not shown) and also for projection in a viewer or projection (also not shown) by illumination passed through a reflecting prism lens 34 mounted in the cassette behind the opening 32 and the film strip run passing thereover. Situated behind the prism 34 are air vent openings (not shown) in the back wall 14 to permit the circulation of air over the prism 34 for cooling and also for drying after film strip processing in the manner to be described below. A pressure plate 36 is mounted in the cassette housing behind the cassette opening to support the segment of the film strip passing thereby. The air vents, the pressure plate 36 and the prism 34 are isolated from the supply and takeup spools 22 and 24 by a labyrinth type light seal formed in part by internal ribs 38.

Also contained in the cassette housing 10 is a processor generally designated by the reference numeral 40 which is operative after exposure of the film strip 26 to deposit a layer of processing fluid onto the emulsion bearing side of the film strip over the entire length thereof. The processor includes a reservoir 44 in which the processing fluid is initially sealed by a tear tab closure 46 secured over a planar opening in the reservoir. In the cassette shown in FIG. 1, the fluid chamber 44 is defined by a separate part adapted to be received in the processor, the part being loaded with the processing fluid and having affixed thereto the tear tab closure 46.

To enable release of the processing fluid from the initially sealed chamber 44 after exposure of the film strip 26, a pull strip 48 having one end releasably secured to the tear tab closure 46 is trained about a pair of guide rollers only one of which, 52, is shown in the drawings so that a free end (not shown) of the pull strip may be engaged by an aperture (not shown) in the supply end of the film strip 26 upon initial rewind movement thereof. The operation of the pull strip 48 is described fully in U.S. Pat. No. 3,895,862 of Joseph A. Stella et al. which is assigned to the assignee of the present invention. Briefly, the free end portion of the pull strip 48 rides against the outermost convolution of the film strip contained on the supply spool 22 as the film strip is paid from the supply spool to the takeup spool 24 during exposure of the film strip. Reversal of the film strip direction of movement during rewind, however, effects an attachment of the pull strip to the supply end leader of the film strip so that the pull strip will be wound with the film onto the supply spool 22. As a consequence, the tear tab closure 46 will be drawn away from the reservoir opening to release the processing fluid to a second chamber 54 in the processor.

The chamber 54 is located over an opening 58 in a processing fluid applicator nozzle 60 and the released processing fluid passes into the chamber and through the nozzle opening for application to the emulsion bearing side of the film strip 26. Incorporated in the processor 40 is a nozzle valve 62 which as later explained in detail with respect to the operation of the cassette is utilized to close off the processor nozzle 60 and thereby disable the processor following treatment of the film strip 26 with the processing fluid. In relation to the nozzle opening 58, the valve 62 is positioned initially to the left as shown in FIG. 1 or upstream of the nozzle opening in terms of the direction of film strip travel during rewind. Additionally, a pressure pad 64 supported by a leaf spring 66 retains the film strip in operative relation to the nozzle 60 during film strip processing.

It is to be noted that the multipurpose cassette and components thereof described in the preceding paragraphs represent a cassette structure which in itself is not novel with the present invention. It is important to a full understanding of the present invention, however, that the characteristics and operation of the cassette illustrated in FIG. 1 be understood. Specifically, following exposure of the film strip by incremental advance thereof past the opening 32 in a direction proceeding from the supply spool 22 to the takeup spool 24, a processing operation is initiated by driving the supply spool at constant angular velocity to rewind the film strip from the takeup spool 24 back onto the supply spool 22. This procedure is effected by removing the cassette from the camera in which it is exposed and placing it in a processor/viewer device (not shown) equipped with appropriate means for driving the supply spool 22 to rewind the film strip 26 in the manner described. During such rewinding movement, the emulsion side of the film strip will be drawn past the nozzle 60 to receive a layer of processing fluid now released from the reservoir 44 as a result of the tear tab closure 46 having been removed in the manner described above.

Figure 3:
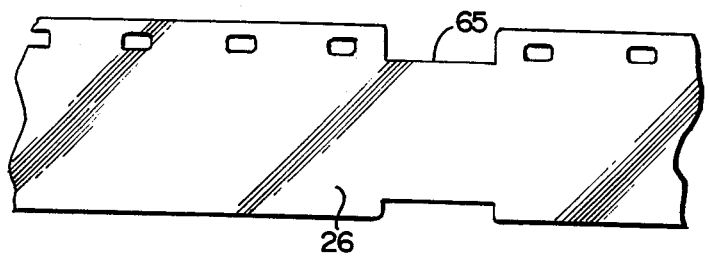
FIG. 3 is a view illustrating that portion of the film strip configured to engage and advance the slide valve to its second position.
Figure 4:
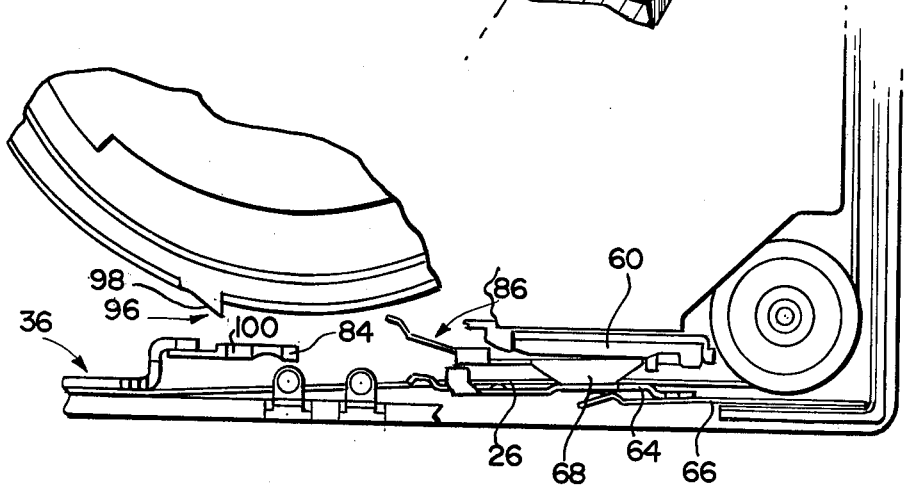
FIG. 4 is a view in elevation of a portion of the cassette of FIG. 1 illustrating the position of the slide valve following advancement to its final position.

Immediately following the processing operation, and, as a result of a film discontinuity of the like, for example, as shown in FIG. 3, a necked down portion 65 located at the leading or takeup end of the film strip, the valve 62 is caused to move to the right from the position illustrated in FIG. 1 to the position illustrated in FIG. 4 wherein it underlies and blocks the nozzle opening 58. Further, during this displacement of the valve 62, the pressure pad 64 is cammed downwardly away from the film strip 26 by side cams 68 of the valve so as to deactivate the pressure pad and to free the film strip 26 for unrestricted travel through the nozzle/pressure pad region, for subsequent projection and rewind cycles.

Figure 2:
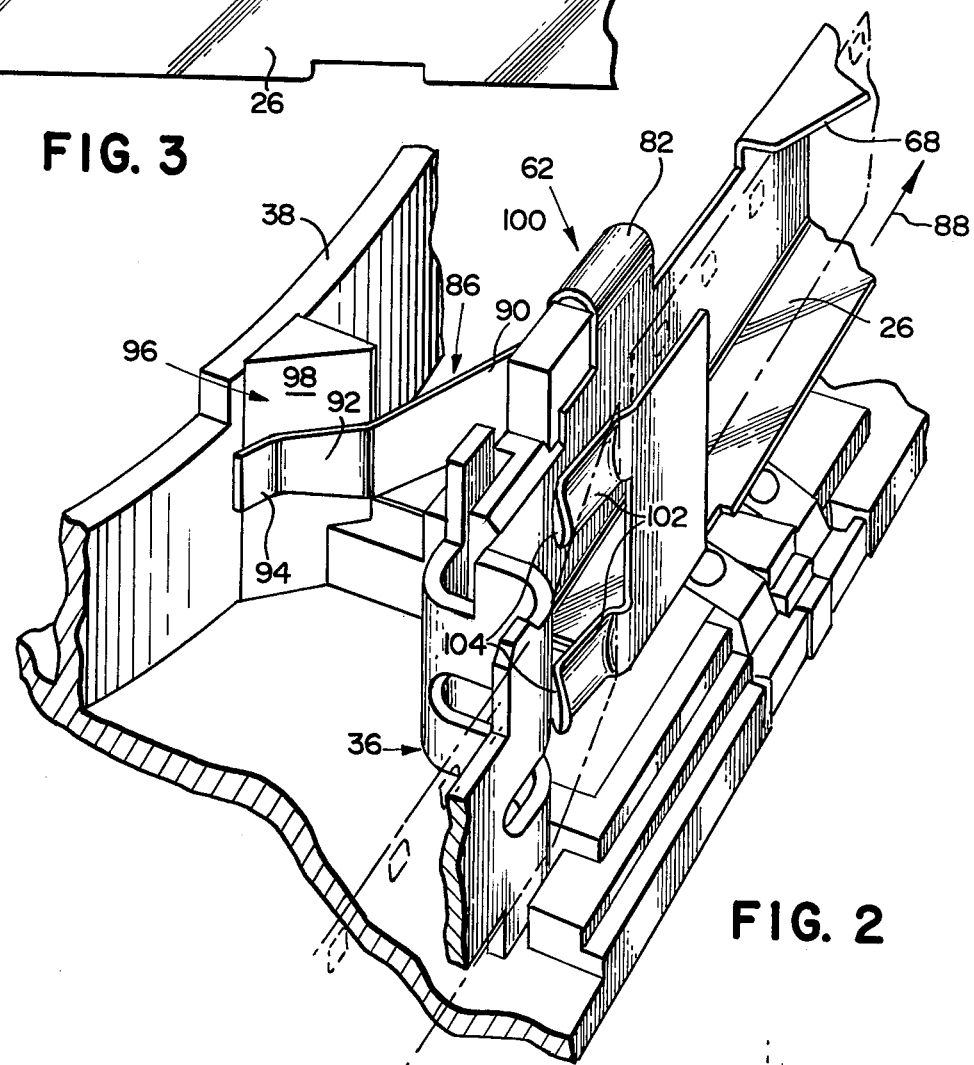
FIG. 2 is a perspective view of a portion of a cassette illustrating the position of the slide valve prior to movement responsive to film advancement.

As previously indicated, a pressure plate 36 is mounted in the cassette housing 10 behind the cassette opening 32 to support the segment of the film strip 26 passing thereby. Referring to FIGS. 1 and 2, the pressure plate 36 comprises a central plate member 67 having a substantially centrally located aperture (not shown) immediately adjacent the prism 34. The plate member 67 terminates at each end in a pressure plate mounting section offset from and parallel to the plane of the central plate member 67. The pressure plate mounting section 72 on the right hand end of the pressure plate, i.e., the end adjacent the nozzle valve 62 is adapted to bear against a mating portion of the cassette internal structure 74 to retain the pressure plate in the position shown in FIG. 1. The pressure plate retaining section 76 at the opposite end of the pressure plate is similarly retained in the position shown in FIG. 1 by a corresponding mating structural section 78 in the interior of the cassette. The pressure plate is held positively in the position shown in FIG. 1 by a leaf spring structure 80 which biases the pressure plate outwardly through a force applied to the plate just to the left of the opening in the pressure plate central member 67. The position of the pressure plate in FIGS. 1 and 2 is that which the pressure plate occupies when the cassette is not operatively engaged with either camera or processing/viewing apparatus.

Again with reference to FIGS. 1 and 2, it will be seen that the displaceable nozzle valve 62 comprises an inverted U-shaped sheet metal section 82 which is adapted to slideably engage a structural portion 84 of the interior of the cassette. Extending from the backside of the U-shaped section 82 of the nozzle valve is a resilient nozzle valve retaining member 86. The retaining member 86 extends from the U-shaped portion of the nozzle valve in a direction opposite and angularly displaced from the direction which the film strip is advanced during the rewind/processing mode of operation. Such direction is indicated by the arrow identified by reference numeral 88 in FIG. 2. The retaining member 86 comprises a first elongated leaf spring section 90 which extends in a direction opposite to the direction of advancement of the film strip and at an angle therefrom somewhat less than 45°. The retaining member additionally comprises an extension 92 of the leaf portion 90 which extends at an angle substantially 45° with respect to the direction of travel of the film strip. The retaining member 86 terminates in a section 94 which extends substantially parallel to the direction of travel of the film strip and which partially overlaps the backside of the retaining section 72 of the pressure plate 36. The significance of this relationship will be subsequently described.

Integrally formed with the outermost light sealing rib 38 is a slide valve retaining ramp 96 having a surface 98 disposed at approximately a 45° angle with respect to the direction of travel of the film strip and configured to engage the portion 92 of the retaining member of the slide valve which is at a 45° angle. The engagement between the 45° portion 92 of the retaining member 86 and the 45° surface 98 of the retaining ramp 96 is such that the slide valve 62 is positively retained in the position illustrated in FIGS. 1 and 2 and in fact is positively biased to the left as viewed in FIG. 1 so that the upper end of the U-shaped portion 82 bears against an upstanding portion of the cassette structure 100.

The leaf spring retaining member 86 is configured such that when in the position described above, and as illustrated in FIGS. 1 and 2, the member is very slightly stressed with the 45° portion 92 in positive contact with the ramp surface 98. Accordingly, it will be appreciated that any tendency of the slide valve to move out of this initial position, i.e., to the right, as a result of sudden jars or the like due to mishandling or dropping of the cassette will be resisted by the engagement of the retaining member 86 with the slide valve retention ramp 96. Stated otherwise, movement of the slide valve to the right as viewed in FIG. 1 would result in deflection of the retaining member downward as a result of the engagement between the 45° portion 92 and the ramp surface 98 which would result in a restoring force tending to bias the slide valve back into position with the upper end of the U-shaped bracket in abutting relationship with the upstanding portion 100 of the cassette.

Following operation of the cassette as described above to deposit processing fluid on the emulsion side of the film strip 26, the necked down portion 65 of the film strip located near the end of the takeup end of the film strip is designed to operatively engage the slide valve and, overcoming the retaining force of the retaining member 86, carry the valve with it to position the valve in its final position in sealing relationship with the nozzle valve 58 as is shown in FIG. 4. Engagement of the necked down portion 65 of the film strip with the slide valve 62 is achieved automatically as the necked down portion is drawn past a pair of spaced parallel fingers 102 which serve, prior to termination of the processing step, to guide the film strip through the region occupied by the slide valve. As is best seen in FIG. 1, each of these guide fingers are provided with a rounded leading end 104 so that they may provide the aforementioned guiding function without marring the backside of the film strip. FIG. 2 illustrates the film strip 26 in phantom lines in engagement with the slide valve and it should be evident therefrom that as the necked down area was progressed past the slide valve that the spaced guiding fingers 102 passed into the notches defining the necked down portion 65 of the film and that continued advancement of the film strip results in positive engagement of the slide valve by the necked down portion and further advancement thereof results in displacement of the slide valve from its initial position to the position illustrated in FIG. 4 where it serves to seal the processing fluid nozzle 58.

As was mentioned hereinabove, the leaf spring retaining member 86 terminates in an end portion 94 which overlaps the end of the pressure plate 72 adjacent the slide valve. During assembly of the cassette, the slide valve is positioned in the cassette prior to installation of the pressure plate, and at some time following installation of the pressure plate in the cassette, the pressure plate may be depressed by finger pressure through the opening in the cassette bottom wall 20 to the position illustrated in phantom lines in FIG. 1 and identified by reference numeral 106. As is evident from this showing, the backside of the pressure plate mounting section 72 engages the end portion 94 of the retaining member 86. Such engagement by the pressure plate will assure that the slide valve retaining member is in its proper position with respect to the retaining ramp 96, i.e., if the valve is slightly displaced to the right, the engagement by the pressure plate will cause movement to the left to place the valve in the desired initial position.

This invention may be practiced or embodied in still other ways without departing from the spirit or essential character thereof. The preferred embodiment described herein is therefore illustrative and not restricted, the scope of the invention being indicated by the appended claims and all variations which come within the meaning of the claims are intended to be embraced therein.

What is claimed is:

1. A photographic film handling cassette for use with other apparatus for treating a strip of exposed photographic film material with processing fluid to develop viewable images on the film strip, said cassette comprising:

a housing for retaining the film strip;
means responsive to drive means of said other apparatus for advancing the film in a given path within said housing;
film processing means for depositing a layer of processing fluid on the exposed film strip, said processing means including a nozzle opening configured for releasing processing fluid to the film strip;
selectively operable means for disabling said film processing means following deposit of said fluid layer, said disabling means comprising a valve member slidably mounted within said cassette for movement, responsive to film advancement in a given direction, in said given direction from a first position adjacent said nozzle opening to a second position wherein said valve member is in blocking engagement with said nozzle opening, said valve member further comprising a leaf spring member forming a part thereof and extending from said valve member in a direction opposite and angularly oriented from said given direction of advancement of said film strip; and cassette structure presenting an engaging surface facing in a direction substantially opposite to said given direction and configured to cooperate with at least a portion of said leaf spring member facing in said given direction when said valve is in said first position, said leaf spring member being further configured to deflect out of engagement with said engaging surface when said valve member is moved from said first position to said second position responsive to film advancement in said given direction.

2. The apparatus of claim 1 wherein said engaging surface and said portion of said leaf spring member cooperate in a manner such that the deflection of said leaf spring member that occurs upon movement of said valve member from said first position in the direction of said second position results in a force between said engaging surface and said portion of said leaf spring member tending to bias said valve member towards said first position, said biasing force being of a magnitude which is overcome by advancement of said valve member from said first position to said second position responsive to film advancement in said given direction.

3. The apparatus of claim 2 wherein said engaging surface and said portion of said leaf spring member are oriented at an angle of about 45° with respect to said given direction of film advancement.

4. The apparatus of claim 2 wherein said housing includes an opening for exposing progressive incremental sections of said film strip, said given path of said film strip traverses said opening, and including a pressure plate located within said housing at said opening, said pressure plate extending substantially parallel to said given direction of film advancement and being disposed within said cassette at the location upstream of said first position relative to said given direction of film advancement, said pressure plate being disposed outwardly of said leaf spring member, relative to the interior of said cassette, and having an end portion partially overlapping the end of said leaf spring member, resilient means for normally biasing said pressure plate into spaced relation with said end of said leaf spring member, said resilient means permitting inward movement of said pressure plate responsive to an external force to an extent that said overlapping end of said pressure plate will positively engage said end of said leaf spring member to assure said end of said leaf spring member and said valve member to which it is attached is in said first position.

5. The apparatus of claim 1 wherein said engaging surface is oriented at an angle with respect to said given direction of film advancement.

6. The apparatus of claim 5 wherein said engaging surface comprises a first planar surface and said cooperating portion of said leaf spring member comprises a second planar surface substantially parallel to and facing said first planar surface so that said first and second planar surfaces are in surface contact to thereby increase frictional engagement therebetween.

* * * * *